United States Patent
DeLuca et al.

(10) Patent No.: US 9,495,519 B2
(45) Date of Patent: Nov. 15, 2016

(54) COMMUNICATIONS SECURITY MANAGEMENT

(75) Inventors: Lisa Seacat DeLuca, San Francisco, CA (US); Lydia M. Do, Raleigh, NC (US); Jenny S. Li, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

(21) Appl. No.: 13/468,093

(22) Filed: May 10, 2012

(65) Prior Publication Data

US 2013/0305316 A1  Nov. 14, 2013

(51) Int. Cl.
*H04L 29/06* (2006.01)
*G06F 21/62* (2013.01)
*G06F 21/00* (2013.01)
*G06F 21/56* (2013.01)

(52) U.S. Cl.
CPC .............. *G06F 21/00* (2013.01); *G06F 21/56* (2013.01); *G06F 21/6218* (2013.01); *H04L 63/08* (2013.01); *H04L 63/102* (2013.01)

(58) Field of Classification Search
USPC ............................................................ 726/4
See application file for complete search history.

(56) References Cited

U.S. PATENT DOCUMENTS

| | | | |
|---|---|---|---|
| 7,287,060 B1* | 10/2007 | McCown et al. | 709/206 |
| 7,831,834 B2* | 11/2010 | Hickman et al. | 713/176 |
| 2004/0203589 A1* | 10/2004 | Wang et al. | 455/410 |
| 2004/0255122 A1* | 12/2004 | Ingerman et al. | 713/176 |
| 2005/0097321 A1* | 5/2005 | Zhu et al. | 713/166 |
| 2005/0198171 A1 | 9/2005 | Landsman et al. | |
| 2006/0031510 A1* | 2/2006 | Beck et al. | 709/226 |

(Continued)

FOREIGN PATENT DOCUMENTS

WO  2008122409 A1  10/2008

OTHER PUBLICATIONS

McGibney et al. "A Trust Overlay Architecture and Protocol for Enhanced Protection against Spam",Published in ARES '07 Proceedings of the The Second International Conference on Availability, Reliability and Security. pp. 749-756 IEEE 2007.*
International Search Report of the International Searching Authority, PCT/US2013/037898 date of mailing Jun. 26, 2013, 13 pages.

(Continued)

*Primary Examiner* — Dede Zecher
*Assistant Examiner* — Jason C Chiang
(74) *Attorney, Agent, or Firm* — Cantor Colburn LLP; Kurt Goudy

(57) ABSTRACT

Implementing communications security includes creating levels of permissions for association with inbound communications. The levels of permissions are indicative of components of the communications enabled for transmission to a recipient computer. The communications security also includes creating conditions upon which currently-assigned levels of permissions are adjustable to a next level of the levels of permissions. In response to identifying an inbound communication received from a sender, the communications security evaluates content of the inbound communication, determines a trust value for the inbound communication responsive to the evaluating, applies the conditions to the inbound communication and the sender, determines an assignment of one of the levels of permissions for the inbound communication in response to applying the conditions, and transmits the inbound communication to the recipient computer, including any components enabled for transmission, based on the assignment of the level of permissions.

9 Claims, 5 Drawing Sheets

(56) References Cited

U.S. PATENT DOCUMENTS

| | | | |
|---|---|---|---|
| 2006/0129644 A1* | 6/2006 | Owen et al. | 709/206 |
| 2006/0165040 A1 | 7/2006 | Rathod et al. | |
| 2006/0168022 A1* | 7/2006 | Levin et al. | 709/206 |
| 2006/0190606 A1* | 8/2006 | Kohavi | 709/226 |
| 2006/0230461 A1* | 10/2006 | Hauser | 726/27 |
| 2006/0253447 A1* | 11/2006 | Judge | 707/9 |
| 2007/0074019 A1* | 3/2007 | Seidel | 713/156 |
| 2007/0180031 A1* | 8/2007 | Stern | G06Q 10/107 709/206 |
| 2007/0208613 A1* | 9/2007 | Backer | 705/10 |
| 2007/0220125 A1* | 9/2007 | Li et al. | 709/223 |
| 2010/0146118 A1* | 6/2010 | Wie | 709/225 |
| 2010/0317319 A1* | 12/2010 | Gorman et al. | 455/410 |
| 2011/0167059 A1* | 7/2011 | Fallah | 707/723 |

OTHER PUBLICATIONS

McGibney et al. "A Trust Overlay Architecture and Protocol for Enhanced Protection against Spam" In: The Second International Conference on Availability, Reliability and Security. Apr. 13, 2007, Retrieved from Internet: Jun. 18, 2013. Available online: <http://eprints.wit.ie/616/1/McGibneyBotvich_ARES_2007.pdf>, 9 pages.

Written Opinion of the International Searching Authority, PCT/US2013/037898, date of mailing Jun. 26, 2013, 6 pages.

U.S. Appl. No. 13/562,580; Final Office Action; Date Filed: Jul. 31, 2012; Date Mailed: Mar. 26, 2014; 29 pages.

U.S. Appl. No. 13/562,580; Final Office Action; Date Filed: Jul. 31, 2012; Date Mailed: Oct. 3, 2013; 45 pages.

U.S. Appl. No. 13/562,580; Non-Final Office Action; Date Filed: Jul. 31, 2012; Date Mailed: Jan. 5, 2015; 30 pages.

* cited by examiner

| 300 | 302 | 304 | 306 | 308 | 310 | 312 | 314 | 316 | 320 | 322 |
|---|---|---|---|---|---|---|---|---|---|---|
| INDIVIDUALS/DOMAIN | | TRUSTED STATUS FOR INDIVIDUALS | PLAIN TEXT | EMBEDDED LINKS | EMBEDDED IMAGES | DOC ATTACH | RICH MEDIA ATTACH | EXECUTABLE ATTACH | COMPRESSED ATTACH | ELIGIBLE - TRUST PROMO PRGM? |
| XYZINC.COM | | | Y | Y | Y | Y | PROMPT BEFORE DOWNLOAD | PROMPT BEFORE DOWNLOAD | PROMPT BEFORE DOWNLOAD | Y |
| JSMITH@XYZINC.COM | | TRUSTED | Y | Y | Y | Y | Y | Y | Y | Y |
| MDOE@XYZINC.COM | | PASSED PROBATION | Y | Y | Y | Y | Y | PROMPT BEFORE DOWNLOAD | Y | Y |
| AJONES@XYZINC.COM | | IN PROBATION | Y | Y | Y | Y | PROMPT BEFORE DOWNLOAD | PROMPT BEFORE DOWNLOAD | PROMPT BEFORE DOWNLOAD | Y |
| ALL CONTACTS IN MY ADDR BOOK | | | Y | Y | Y | Y | Y | N | PROMPT BEFORE DOWNLOAD | Y |
| OTHERS | | | Y | N | N | N | N | N | N | N |

FIG. 3

COMMUNICATIONS SECURITY MANAGEMENT

BACKGROUND

The present invention relates to electronic messaging and, more particularly, to communications security management.

Savvy electronic device users have learned methods to detect and avoid the simplest forms of spam or phishing emails using various techniques such as filters. While automated spam filters are far from perfect, they are getting better at weeding out easily detectable issues. However, there is still some required work for more complex schemes in which the user must effectively choose a filter that will not miss items it should have filtered or will catch things it should not have filtered. Each time a new solution becomes available, it isn't long before spammers and phishers develop a new way to send undesirable emails.

SUMMARY

According to one embodiment of the present invention, a system for implementing communications security services is provided. The system includes a computer processor and logic executable by the computer processor. The logic is configured to implement a method. The method includes creating levels of permissions for association with inbound communications. Each of the levels of permissions is defined as an incrementally-adjustable level of trust. The levels of permissions are indicative of components of the inbound communications enabled for transmission to a recipient computer. The method also includes creating conditions upon which currently-assigned levels of permissions are adjustable to a next level of the levels of permissions. In response to identifying, via the computer processor, an inbound communication received from a sender, the method includes evaluating content of the inbound communication and determining a trust value for the inbound communication responsive to the evaluating, applying the conditions to the inbound communication and the sender, determining an assignment of one of the levels of permissions for the inbound communication responsive to applying the conditions, and transmitting, via the computer processor, the inbound communication to the recipient computer, including any components enabled for transmission based on the assignment of one of the levels of permissions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 depicts a table with sample data used in implementing the communications security according to an embodiment.

DETAILED DESCRIPTION

Exemplary embodiments relate to communications security, which provides the ability for individuals and entities utilizing communications tools to define and implement levels of permissions and applied conditions that control inbound electronic communications, whereby the levels of permissions are incrementally adjustable upward and downward over time based on a history or pattern of established 'trustworthiness' of communications received from a sender of the communications. The exemplary communications security tracks inbound communications received from a given sender, analyzes the communications to determine a trust value, and applies the conditions to determine whether to adjust the levels of permissions over time. In an embodiment, a communication from a sender whose permissions level is adjusted upwardly is offered greater flexibility in the type of components of the communication that may be delivered to a recipient. These and other features, of the communications security services will now be described in an exemplary embodiment.

Figure 1:
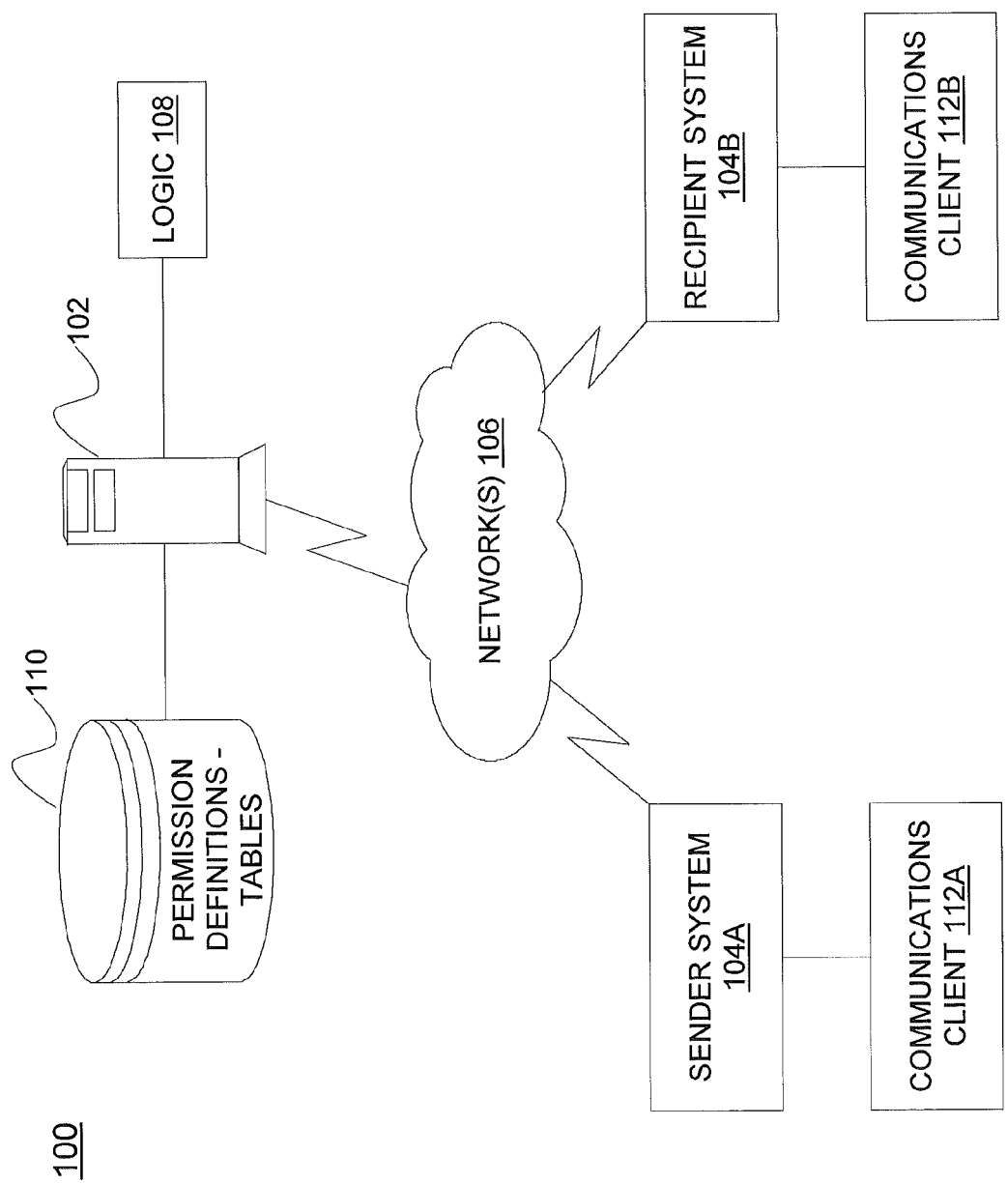
FIG. 1 a block diagram of a system for implementing communications security services according to an embodiment.

Turning now to FIG. 1, a system 100 upon which the exemplary communications security services may be implemented will now be described. The system 100 of FIG. 1 includes a host system computer 102 and two user systems 104A and 104B (e.g., a sender system 104A and a recipient system 104B, respectively) in communication with one or more networks 106.

The host system computer 102 may be implemented as one or more high-speed computer processing devices, such as one or more mainframe computers capable of handling a high volume of computing activities conducted by end users of the communications security services, such as the user systems 104A-104B. The host system computer 102 executes logic 108 for implementing the communications security services described herein. Alternatively, a portion of the logic 108 may reside on a user system, such as one or more of the user systems 104A and 104B. The logic 108 may also include an interface that enables authorized individuals to define permissions and conditions, as will be described herein.

The host system computer 102 may be implemented by a communications services provider (e.g., an email services provider), a social networking provider, or an enterprise in which at least one of the user systems 104A and 104B forms part of a host-attached network of computer systems.

The defined permissions and conditions used in performing the communications security services may be stored by the host system computer 102 in a storage device 110, which is communicatively coupled to the host system computer 102. The storage device 110 may also store tables of information relating to user accounts. As indicated above, the levels of permissions may be defined to control inbound electronic communications for a recipient and may be incrementally adjustable upward and downward over time based on a history or pattern of established 'trustworthiness' of a sender of the communications. The levels of permissions and the related conditions are described further herein. It is understood that the storage device 110 may be implemented using memory contained in the host system computer 102 or may be a separate physical device, as illustrated in FIG. 1. The storage device 110 may be logically addressable as a consolidated data source across a distributed environment that includes a network (e.g., networks 106).

The host system computer 102 operates as a database server and coordinates access to application data including data stored on the storage device 110. The host system computer 102 may be implemented using one or more servers operating in response to a computer program stored in a storage medium accessible by the server.

The user systems 104A and 104B may include portable, wireless communication devices, such as smart phones, personal digital assistants, and tablet PCs, or may be wired devices, such as general-purpose computers, laptops, and host-attached terminals.

The user systems 104A and 104B each includes processing circuits and I/O interfaces, such as a keyboard, a display device and network interface. The user systems 104A and 104B can include various computer hardware and software technology known in the art, such as one or more processing units or circuits, volatile and non-volatile memory including removable media, power supplies, network interfaces, support circuitry, operating systems, and the like. While only two user systems 104A and 104B are shown by way of non-limiting example, it will be understood that any number of user systems 104 may be employed in realizing the advantages of the exemplary embodiments described herein.

In one embodiment, user systems 104A-104B are implemented by end users of an entity, such as an organization or enterprise. For example, the user systems 104A-104B are provided to individuals within the organization for performing work-related tasks, whereby the organization or enterprise implements the host system computer 102.

Each of the user systems 104A and 104B executes a corresponding communications client 112A and 112B, which may be any communications messaging application, such as an instant messenger, a text messenger, voice communication, email, etc. The user systems 104A and 104B are network-enabled such that they are capable of communicating over the networks 106 with each other via the respective communications clients 112A and 112B. The networks 106 may be any type of known networks including, but not limited to, a wide area network (WAN), a local area network (LAN), a global network (e.g. Internet), a virtual private network (VPN), and an intranet. The networks 106 may be implemented using a wireless network or any kind of physical network implementation known in the art, e.g., using cellular, satellite, and/or terrestrial network technologies.

As described above, the exemplary communications security services provide the ability for individuals and entities utilizing communications tools to define and implement levels of permissions and applied conditions that control inbound electronic communications, whereby the levels of permissions are incrementally adjustable upward and downward over time based on a history or pattern of established 'trustworthiness' of the communications. The exemplary communications security tracks incoming communications from one or more senders with respect to an intended recipient, analyzes the communications to determine a trust value, and applies the conditions to determine whether to adjust the levels of permissions over time. The levels of permissions dictate the types of content in the communications that may be delivered to a recipient's inbox.

Figure 2A:
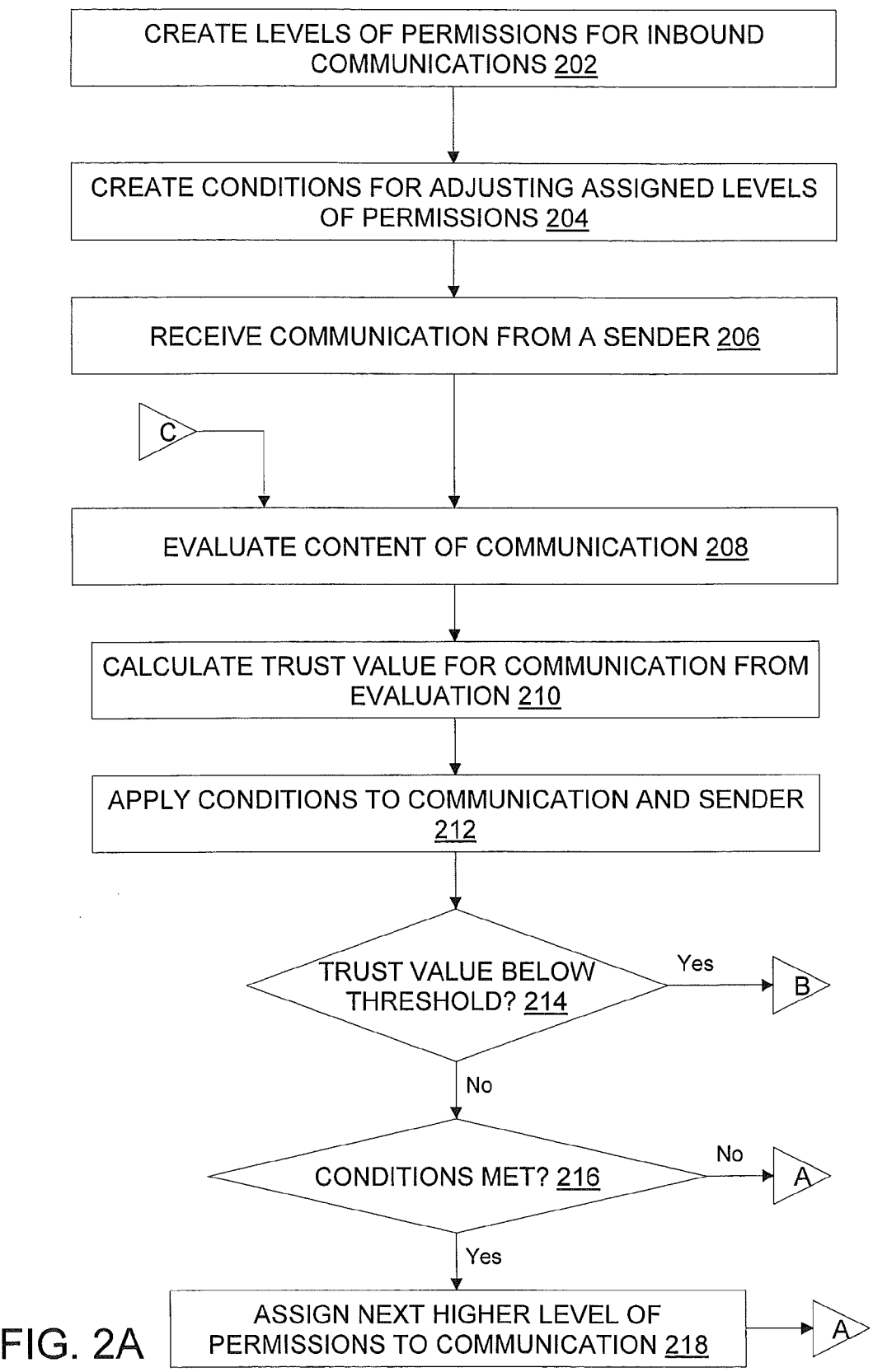
FIG. 2 depicts a flow diagram of a process for implementing communications security services according to an embodiment.
Figure 2B:
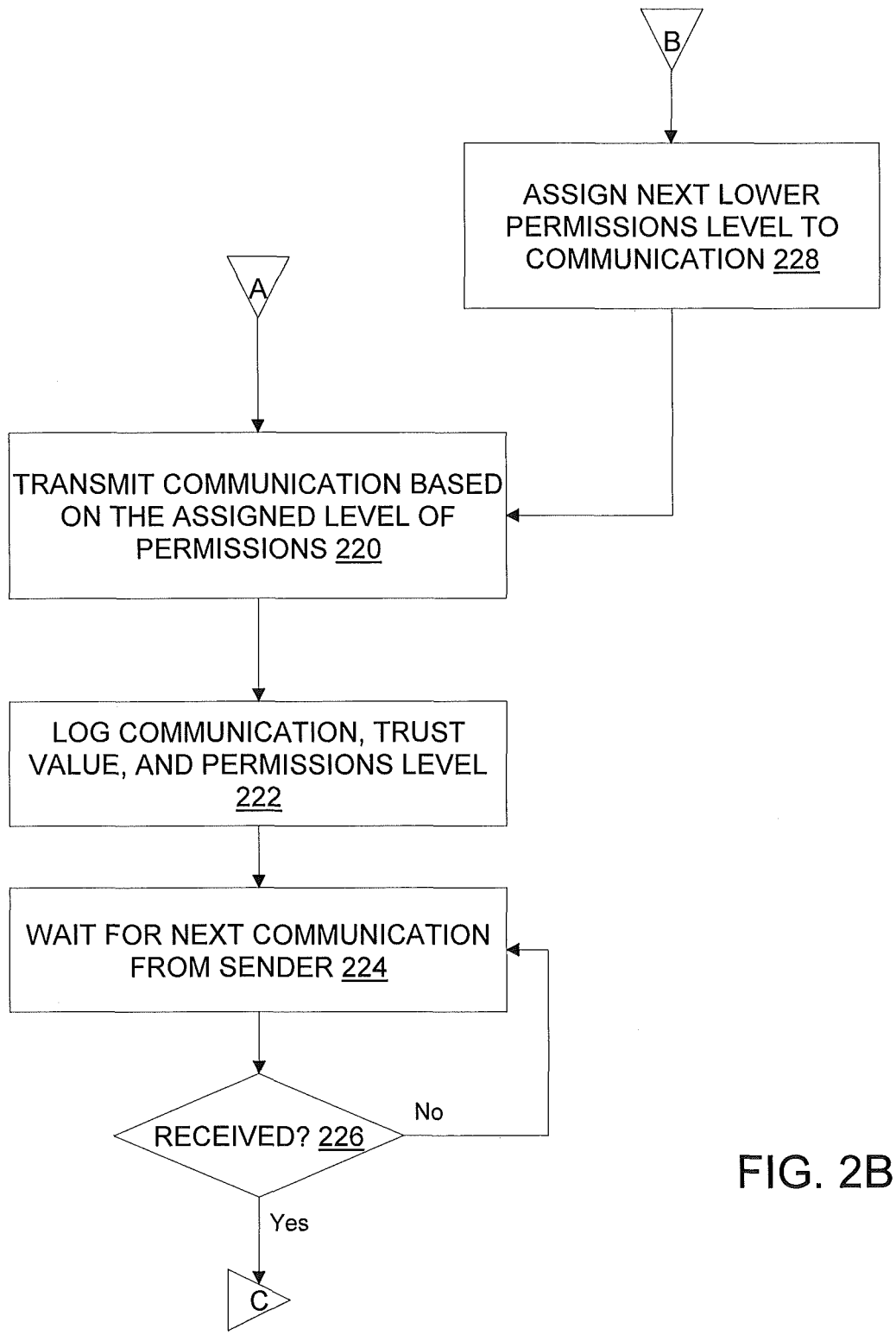

Turning now to FIGS. 2A-2B, a process for implementing the communications security services will now be described in an exemplary embodiment. For purposes of illustration, and by way of non-limiting example, the processes described in FIGS. 2A-2B assume that the user system 104A represents a sender system and the user system 104B represents a recipient system.

At step 202 of FIG. 2A, the interface of the logic 108 prompts an authorized individual to define levels of the permissions for incoming, or inbound, communications. Each of the levels of permissions is defined as an incrementally-adjustable level of trust and indicates particular components of the inbound communication that will be enabled for transmission to the recipient system, such as recipient system 104B. As shown in FIG. 3, these levels of permissions are illustrated in a table 300 in column 304. In one example, the permissions levels are defined as 'trusted', 'passed probation', and 'in probation'. In this example, an inbound communication designated as 'trusted' is considered to be safer than other communications that have been assigned 'passed probation' and 'in probation.' The 'trusted' level of permissions may indicate to a recipient computer that the communications from the sender are believed to be harmless when presented on the recipient's computer in terms of spamming, spoofing, viruses, and/or other security-related issues. This 'trusted' level of permissions is granted or assigned to inbound communications received from a sender once the sender has 'earned' the trust of the recipient based on historical information gleaned from past communications. In an embodiment, the 'trusted' level of permissions is granted for communications from a sender that have successfully passed through the 'in probation' level of permissions and the 'passed probation' level of permissions. The sender's identification is shown in column 302 of FIG. 3.

The 'passed probation' level of permissions may define communications from a sender as those which are in the process of 'earning' a trusted status based on historical information from past communications; however, there may not be as much historical information processed over a period of time to reliably assign the highest level of permissions. Thus, the 'passed probation' is considered an intermediary level of permissions. In addition, the 'passed probation' level of permissions may define communications from a sender which have been downgraded from the 'trusted' status via a roll-back mechanism based on issues detected during previous communications. The roll-back mechanism is described further in FIG. 4.

The 'in probation' level of permissions may define communications from a sender that are also in the process of 'earning' a trusted status but either has no previous history (e.g., has not sent previous communications to a recipient) or have been downgraded from another level of permissions (e.g., the 'passed probation' level) through the roll-back mechanism based on issues detected during previous communications. The more trusted the level of permissions, the greater number of components may be enabled for transmission to the recipient with respect to the inbound communications.

While the three levels of permissions described above are provided for purposes of illustration, it will be understood that the levels of permissions may be defined using any type of metric including any hierarchical or tiered system in which levels can be incrementally adjusted upward and downward as needed.

In an exemplary embodiment, the levels of permissions are further defined by the components of a communication that are permitted for delivery to the recipient computer. For example, components of an inbound communication may include plain text in the body of the communication, an embedded link, an embedded image, a document attachment, a rich media attachment, and an executable attachment. As shown in FIG. 3, for example, for each of the levels of permissions associated with to senders JSMITH, MDOE, and AJONES, the components plain text (column 306), embedded links (column 308), embedded images (column 310), and document attachments (column 312) are permitted to be delivered to the recipient as components of the inbound communications from these senders. However, only an inbound communication from sender JSMITH, who is assigned a 'trusted' level of permissions, is allowed to be delivered with a rich media attachment (column 314), an executable attachment (column 316), and a compressed attachment (column 320). For MDOE, who has passed probation, the level of permissions assigned indicates that the recipient will be notified by a prompt from the logic 108 before allowing the recipient to download an executable attachment. By contrast, when AJONES, who is in probation, sends a communication, the recipient will be notified by a prompt from the logic 108 before allowing the recipient to download rich media attachments, executable attachments, and compressed attachments.

Column 322 of the table 300 may be used to indicate which individuals and/or domains are eligible for the communications security services.

Returning to FIG. 2A, at step 204, the interface of the logic 108 prompts the authorized individual to define conditions for adjusting currently-assigned levels permissions with respect to inbound communications. The adjustments are made, if applicable, incrementally for an assigned level of permissions. The conditions specify rules for assigning an individual or domain to a level of permissions, a minimum duration of time in which the individual or domain will stay in an assigned level of permissions before being upgraded to another level of permissions, a minimum number of communications sent to the recipient by the sender within a defined period of time in which trust values of the communications have met a minimum threshold value, and events that affect the movement or placement of a sender in a given level of permissions. For example, a first communication sent by a sender to a particular recipient may be automatically assigned to a lowest level of permissions (e.g., in probation) and communications from the sender may remain in that assignment for a minimum of 30 days before becoming eligible for promotion to a higher level of permissions. The logic 108 includes a tracking mechanism for tracking the amount of time a sender is assigned to each of the levels of permissions. In another example, minimum number of communications sent or received within a defined period of time and which have been evaluated as having trust values meeting the minimum threshold value, may be used in considering an adjustment to a next higher level of permissions. Events or risk indicators that may affect the movement or placement of a sender in a given level of permissions may include detection of one or more elements in a communication that negatively impacts the trust value of the communication. For example, the logic 108 may identify a blank subject line of the communication, a domain in the communication that has been previously known to be suspect, an unusual pattern of text or an empty body in the communication. The logic 108 analyzes content of communications in order to determine this trust value. An authorized individual may configure a threshold value for use in assessing whether a trust value is to be considered suspect.

Once the definitions of the levels of permissions and the conditions have been configured, the logic 108 stores this information in a table, such as table 300, for use in performing the communications security services described herein.

Returning again to FIG. 2A, at step 206, the logic 108 identifies an inbound communication from sender system 104A to the recipient system 104B. The sender system 104A selects a 'send' option on the communications client 112A, and the logic 108 on host system 102 intercepts the inbound communication before it is delivered to the recipient system 104B.

At step 208, the logic 108 evaluates the content of the inbound communication. This evaluation may include analyzing the content of the inbound communication for various elements, such as embedded links, embedded images, document and/or rich media attachments, executable attachments, and compressed attachments, to name a few. The evaluation also includes determining whether any elements that are considered to be potential risks to the security or integrity of the recipient system 104B are present, such as suspicious or unusual patterns of text, domain names or information subject to high incidences of viruses, or other indicators. The logic 108 determines a trust value from the evaluation of any risk indicators identified for the communication at step 210. The trust value may be any metric, such as a number scale or percentage of risk determined for the communication.

At step 212, the logic 108 applies the conditions defined in step 204 to the communication and the sender (e.g., identifier of the sender or sender system 104A). The conditions may be defined according to the needs of an organization for which the communications security services are provided. As indicated above, the conditions may include a minimum duration of time communications from a sender are assigned to a given level of permissions before becoming eligible for promotion to the next higher level. As indicated above, the conditions may additionally, or alternatively, include a minimum number of communications from a sender that are evaluated with trust values that meet a minimum threshold value. The conditions may further include that none of the inbound communications received from a sender may include elements determined as suspect, e.g., empty body of email, no subject line, an unusual pattern of text in the body, or domain name that has been identified as suspect.

A step 214, the logic 108 determines whether the trust value is below or has fallen below a threshold value. If the trust value has not fallen below the threshold value at step 214, the logic 108 determines whether the conditions set forth in the definitions have been met at step 216. If so, this means the communications from the sender with respect to the recipient have been considered safe for the duration of time defined in the level of permissions, or a minimum number of communications from the sender to the recipient within a defined period of time have met the minimum threshold set for the trust value. The logic 108 assigns the next higher permissions level to the sender, and the process proceeds to FIG. 2B.

At step 220, the logic 108 transmits the communication to the recipient system 104B based on the assigned level of permissions. For example, if the sender is assigned a trusted level of permissions, the recipient may be allowed to receive any type of link, document, or attachment from the sender.

At step 222, the logic 108 logs the communication, trust value, and permissions level in the storage device 110. The logic 108 maintains a repository of historical information concerning the sender including, for example, the date/time stamp of each communication, the recipient to whom the communication is addressed, the trust value calculated for the communication, and other data.

At step 224, the logic 108 waits for the next inbound communication from a sender system, such as sender system 104A (or alternatively, recipient system 104B if the recipient system becomes a sender). At step 226, the logic 108 determines whether another communication has been received at the host system computer 102. If not, the process returns to step 224 whereby the logic 108 continues to wait. Otherwise, if another inbound communication has been received at step 226, the process returns to step 208 (FIG. 2A).

Returning now to step 216, if the conditions have not been met, the process proceeds to step 220 of FIG. 2B. Returning to step 214, if the trust value is below or falls below a threshold value, the process proceeds to FIG. 2B, and the logic 108 assigns a next lower permissions level to the sender at step 228. The process then continues at step 220.

In an embodiment, once the sender has been assigned to a next level of permissions (upward or downward), the logic 108 may be configured to reset the timing mechanism for tracking the amount of time the sender is in the assigned level of permissions and/or the number of trusted communications received from the sender within a defined period of time.

Figure 4:
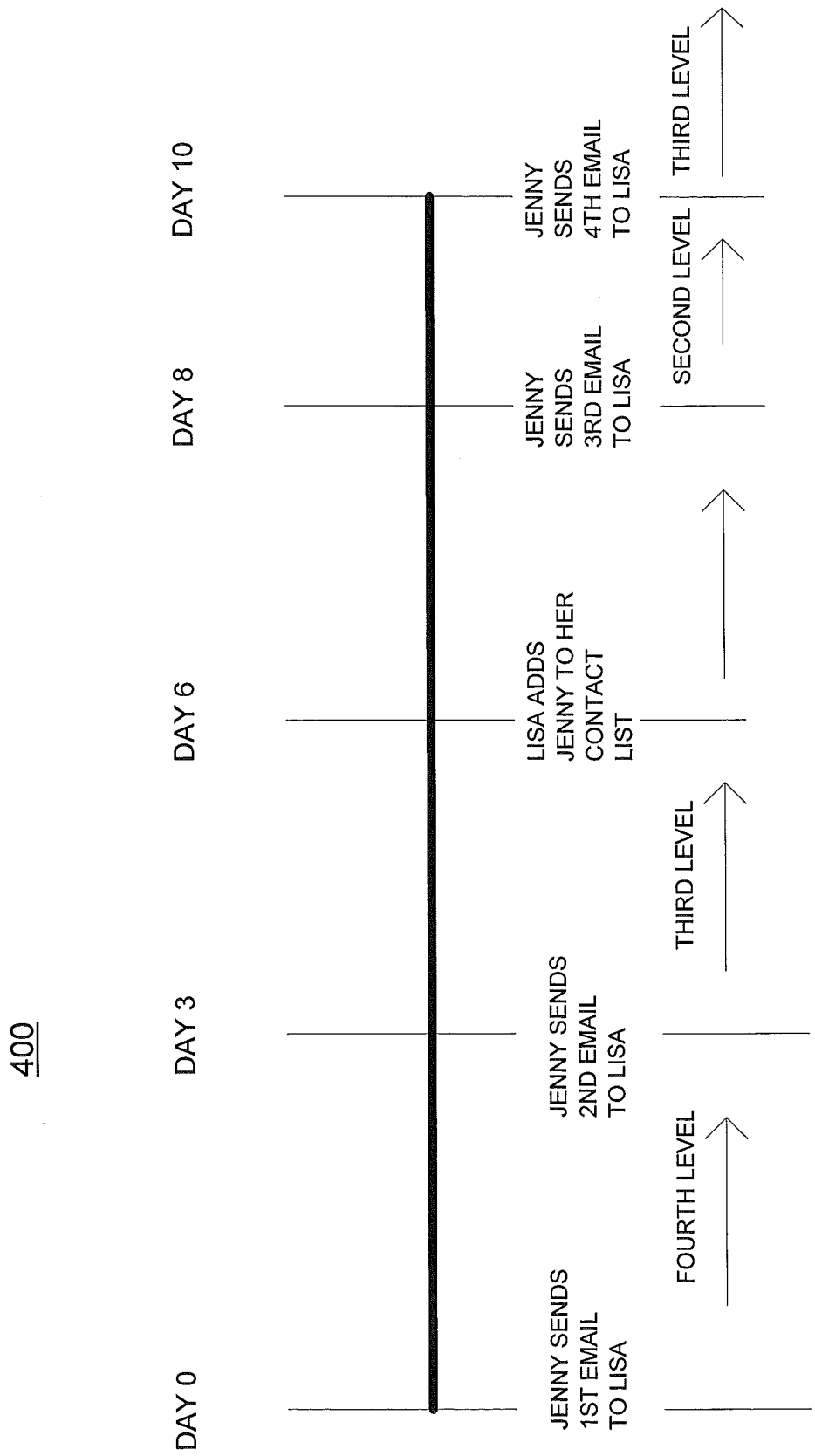
FIG. 4 is a diagram depicting a roll-back mechanism used in implementing communications security according to an embodiment.

FIG. 4 illustrates a sample diagram 400 of a timeline of activities conducted by two individuals, Jenny and Lisa. The timeline is provided for purposes of illustration as one example of the communications security processes and is not intended to be limiting in scope. The timeline extends from Day 0 through Day 10. On Day 0, Jenny sends Lisa an email. This is the first email sent from Jenny to Lisa. The email is voluminous and contains several images embedded therein (not shown). Lisa receives the email but since Jenny is not on Lisa's contact list, the email is assigned a lowest level of permissions (e.g., a fourth level) that truncates emails having this level of permissions to a limit of 150 characters. Accordingly, Lisa does not see the images within the email due to the truncation of the email before it is delivered to Lisa's inbox.

On Day 3, Jenny sends Lisa a second email. Since Jenny has previously sent Lisa an email, the communications security process identifies this history between Jenny and Lisa and assigns a higher level of permissions (e.g., a third level) to communications from Jenny and Lisa. For example, the second email may be truncated to 200 characters while still removing the images, indicating a higher level of trust.

On Day 6, Lisa adds Jenny to her contact list. This activity may signify to the logic that Jenny is a trusted individual. This activity of adding Jenny to Lisa's contact list, in conjunction with the duration of time that has elapsed since Jenny's first email to Lisa, and also in conjunction with the number of previous emails sent, is used by the logic to determine that communications from Jenny are historically trustworthy. Accordingly, on Day 8 Jenny sends Lisa another email, and Lisa receives the entire email including any links, attachments, graphics, etc. For example, this email sent on Day 8 is assigned a second level of permissions, which is higher than the third level.

On Day 10, Jenny sends a fourth email to Lisa. The email is evaluated and is determined to have a risk value that falls below a minimum risk value threshold. For example, the fourth email may contain an empty body or subject line, or other risk indicators. The permissions level previously assigned (i.e., second level) is 'rolled back' to the third level for this email as illustrated in the timeline of FIG. 4.

In a further embodiment, the levels of permissions and conditions may be further defined to identify and assign sender identifications to permissions levels based on the domain (e.g., any sender from the domain is assigned a given level of permissions) or a combination of sender identification and domain.

Technical effects of the communications security include providing the ability for individuals and entities utilizing communications tools to define and implement levels of permissions and applied conditions that control inbound electronic communications, whereby the levels of permissions are incrementally adjustable upward and downward over time based on a history or pattern of established 'trustworthiness' of a sender of the communications. The exemplary communications security tracks inbound communications from a given sender, analyzes the communications to determine a trust value, and applies the conditions to determine whether to adjust the levels of permissions over time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A communications receiving system, comprising:
a computer processing device; and
logic executable by the computer processing device to implement communications security services, the logic configured to:
create levels of permissions for association with inbound communications received from sender computer systems, each of the levels of permissions defined as an incrementally-adjustable level of trust, the levels of permissions indicative of components of the inbound communications enabled for transmission by the computer processor to a recipient computer;
create conditions upon which currently-assigned levels of permissions are adjustable to a next level of the levels of permissions, the conditions including a pre-defined amount of time that the sender computer systems reside at a corresponding level of permission and meeting a minimum threshold value before becoming eligible for movement to another of the levels of the permissions and a minimum number of communications received from the sender within a defined period of time that meet a minimum threshold value; and in response to identifying, via the computer processing device, an inbound communication received from a sender of one of the sender computer systems:

evaluate content of the inbound communication and determining a trust value for the inbound communication responsive to the evaluating;

apply the conditions to the inbound communication and the sender;

determine an assignment of one of the levels of permissions for the inbound communication responsive to the applying the conditions;

transmit, via the computer processing device, the inbound communication to the recipient computer; and transmit, with the inbound communication, only those components enabled for transmission based on the assignment of the one of the levels of permissions.

2. The system of claim 1, wherein the components include at least one of:

plain text in a body of the inbound communication;
an embedded link;
an embedded image;
a document attachment;
a rich media attachment; and
an executable attachment.

3. The system of claim 1, wherein the levels of permissions include:

a first level indicative of a least amount of the components enabled for the transmission;

a second level indicative of an amount of the components enabled for the transmission that is greater than the amount of components enabled for the first level; and a third level indicative of enablement of an amount of the components enabled for the transmission that is greater than the amount of components enabled for the first level and the second level.

4. The system of claim 1, wherein determining the assignment of one of the levels of permissions includes:

adjusting a currently-assigned level of permissions for the communications received from the sender to a next higher level of the levels of permissions when the trust value of the inbound communication meets a minimum threshold value and the conditions are met;

wherein the logic is further configured to reset a timer mechanism for tracking the amount of time that the sender is assigned to the next higher level.

5. The system of claim 1, wherein determining the assignment of one of the levels of permissions includes:

adjusting a currently-assigned level of permissions for the communications received from the sender to a next lower level of the levels of permissions when the trust value of the inbound communication falls below a minimum threshold value.

6. The system of claim 1, wherein a minimum threshold value of the trust value is met when the inbound communication is absent at least one of:

spam;
empty body of the inbound communication; and
uncommon text pattern in body of the inbound communication.

7. The system of claim 1, wherein creating the levels of permissions includes classifying the inbound communications by a user name within a domain of each of the senders, and the components of the inbound communications enabled for transmission to the recipient computer are defined as a function of the classifying by the user name.

8. The system of claim 1, wherein creating the levels of permissions includes classifying the inbound communications by a domain name of each of the senders, and the components of the inbound communications enabled for transmission to the recipient computer are defined as a function of the classifying by the domain name.

9. The system of claim 1, wherein in response to identifying the inbound communication from the sender is a first communication from the sender to the recipient computer, the logic is further configured to:

automatically assign, to the sender, one of the levels of permissions having a least amount of the components enabled for the transmission, wherein the one of the levels of permissions having a least amount of the components enabled for transmission, in conjunction with a minimum duration of time in which the sender is assigned to the one of the levels of permissions, provides a probationary period for the sender with respect to the recipient computer.

* * * * *